No. 692,780. Patented Feb. 4, 1902.
C. CAMPBELL.
HOISTING ENGINE.
(Application filed Feb. 4, 1901.)
(No Model.) 4 Sheets—Sheet 1.
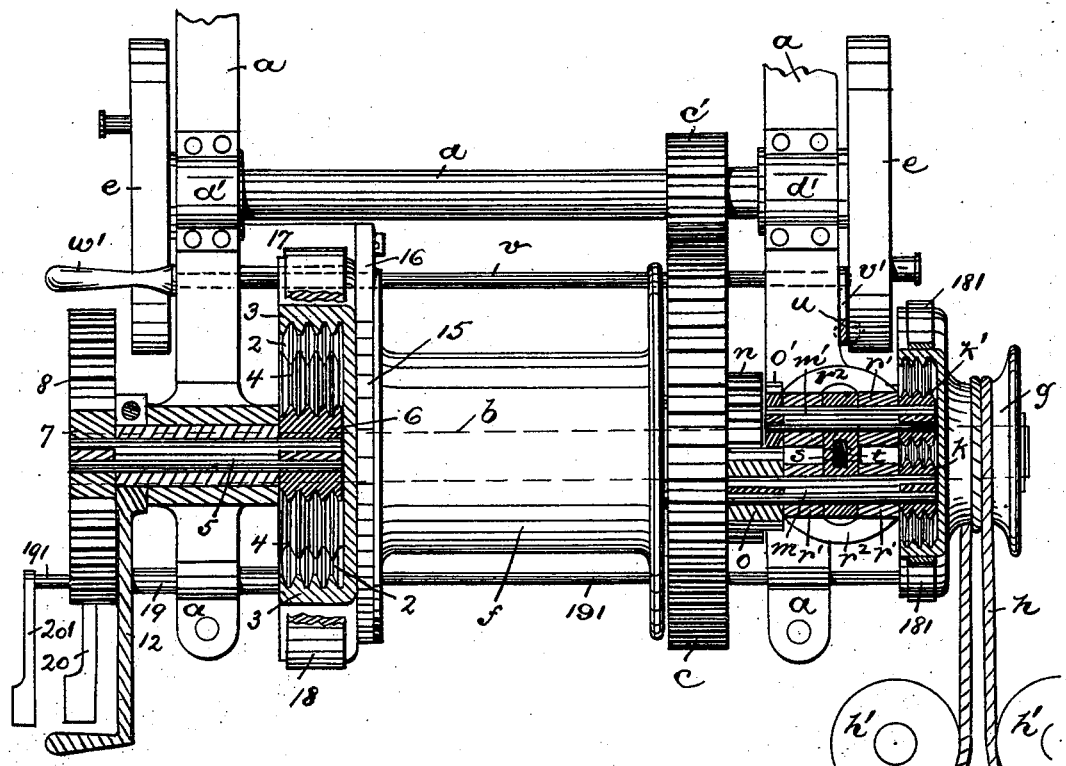
Fig. 1.
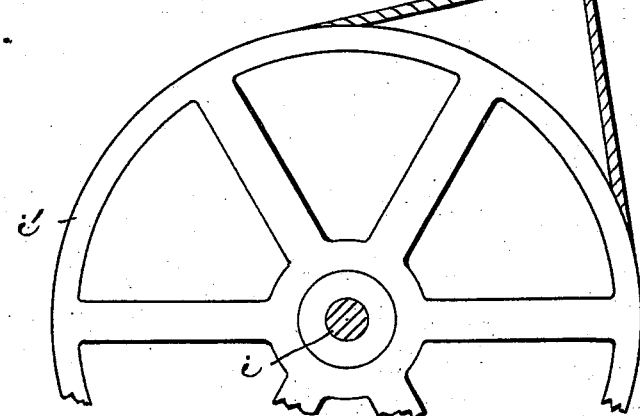
WITNESSES:
Henry Krug
Russell M. Everett
INVENTOR:
Colin Campbell
BY
Drake
ATTORNEYS.

No. 692,780. Patented Feb. 4, 1902.
C. CAMPBELL.
HOISTING ENGINE.
(Application filed Feb. 4, 1901.)
(No Model.) 4 Sheets—Sheet 2.

WITNESSES: Henry King, Russell M. Everett

INVENTOR: Colin Campbell,
BY Drake & Co.
ATTORNEYS.

No. 692,780. Patented Feb. 4, 1902.
C. CAMPBELL.
HOISTING ENGINE.
(Application filed Feb. 4, 1901.)
(No Model.) 4 Sheets—Sheet 3.
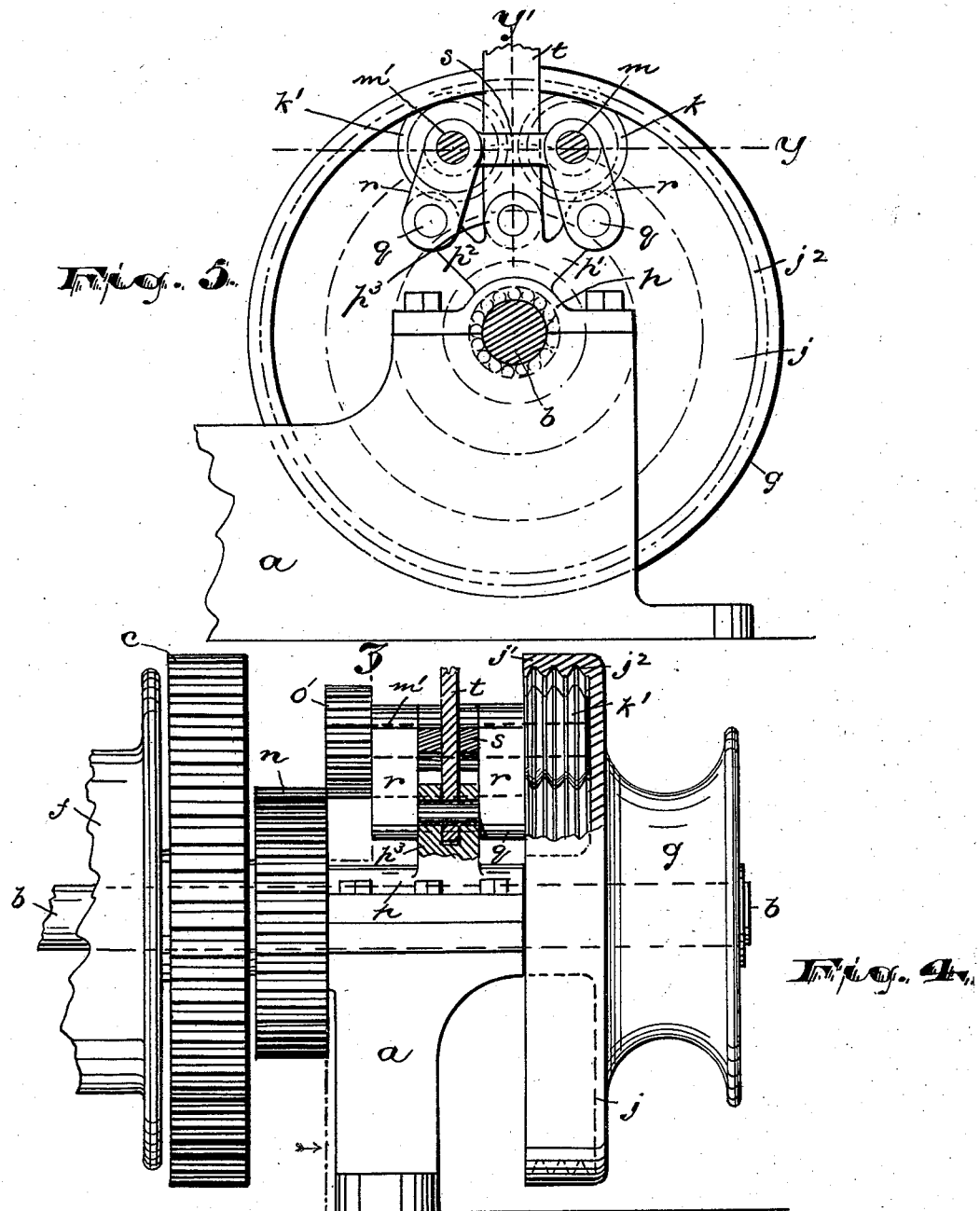

No. 692,780. Patented Feb. 4, 1902.
C. CAMPBELL.
HOISTING ENGINE.
(Application filed Feb. 4, 1901.)
(No Model.) 4 Sheets—Sheet 4.
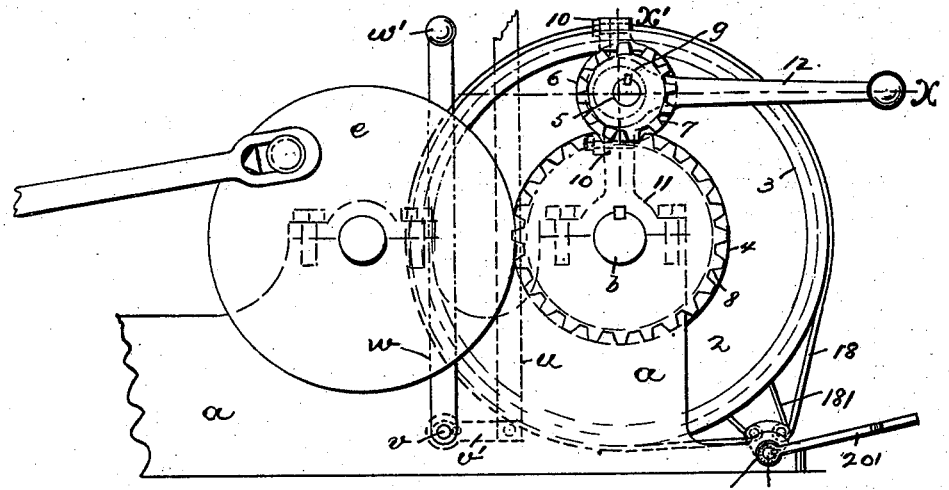
Fig. 6.
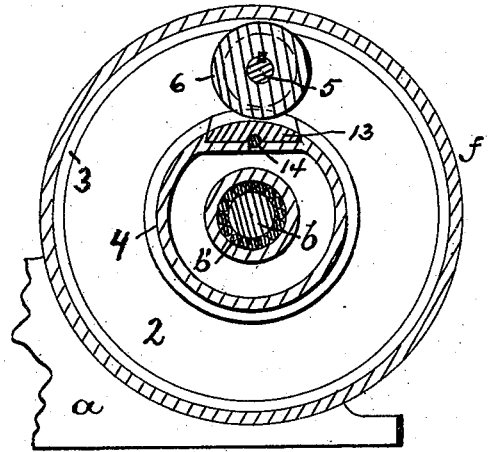
Fig. 7.
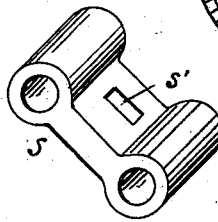
Fig. 8.
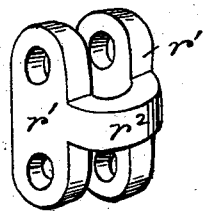
Fig. 9.
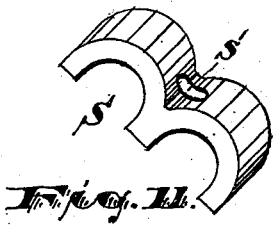
Fig. 11.
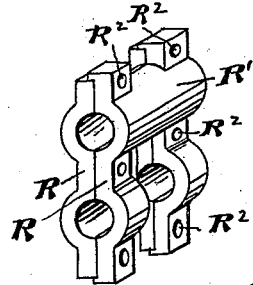
Fig. 10.
Fig. 12.
WITNESSES:
Henry Krug
Russell M. Everett
INVENTOR
Colin Campbell,
BY Drake & Co.
ATTORNEYS.

UNITED STATES PATENT OFFICE.

COLIN CAMPBELL, OF NEWARK, NEW JERSEY, ASSIGNOR TO JOSEPH S. MUNDY, OF NEWARK, NEW JERSEY.

HOISTING-ENGINE.

SPECIFICATION forming part of Letters Patent No. 692,780, dated February 4, 1902.

Application filed February 4, 1901. Serial No. 45,854. (No model.)

*To all whom it may concern:*

Be it known that I, COLIN CAMPBELL, a citizen of the United States, residing at Newark, in the county of Essex and State of New Jersey, have invented certain new and useful Improvements in Hoisting-Engines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The objects of this invention are to provide improved means for transmitting motion from a rotary shaft to a drum or winch normally loose on said shaft; to enable motion to be transmitted from the shaft, turning uniformly in one direction, to rotate the drum or winch in either direction; to obtain such a transmission of motion with a minimum loss of power and without a positive locking of the parts together; to enable the drum or winch to be run at different speeds in their opposite directions with reference to the shaft; to obtain a prompt and complete engagement or disengagement of the contacting friction-surfaces and to enable the degree of pressure with which they engage each other to be perfectly controlled by the operator, and to secure other advantages and results, some of which may be referred to hereinafter in connection with the description of the working parts.

The invention consists in the improved friction device for hoisting-engines and in the arrangements and combinations of parts of the same, all substantially as will be hereinafter set forth and finally embraced in the clauses of the claim.

Figure 2:
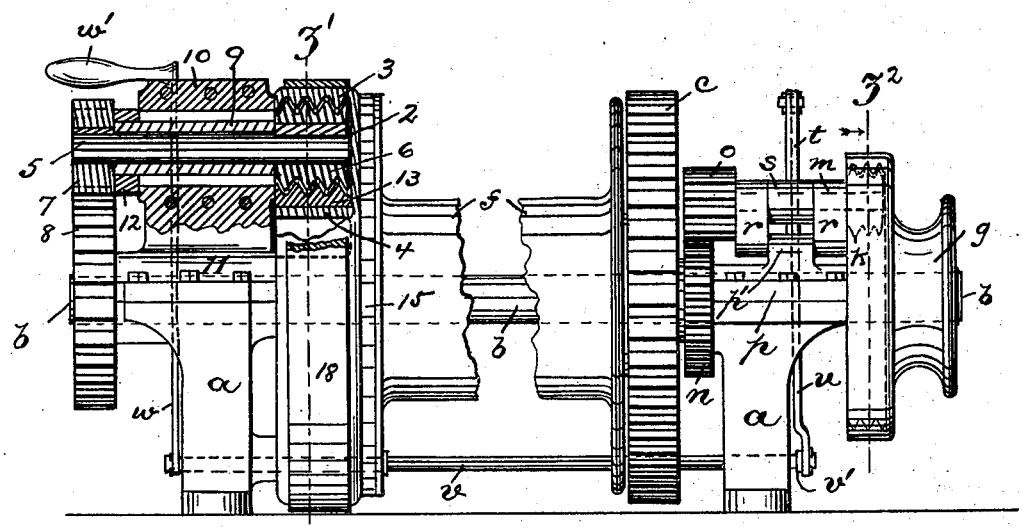
Figure 3:
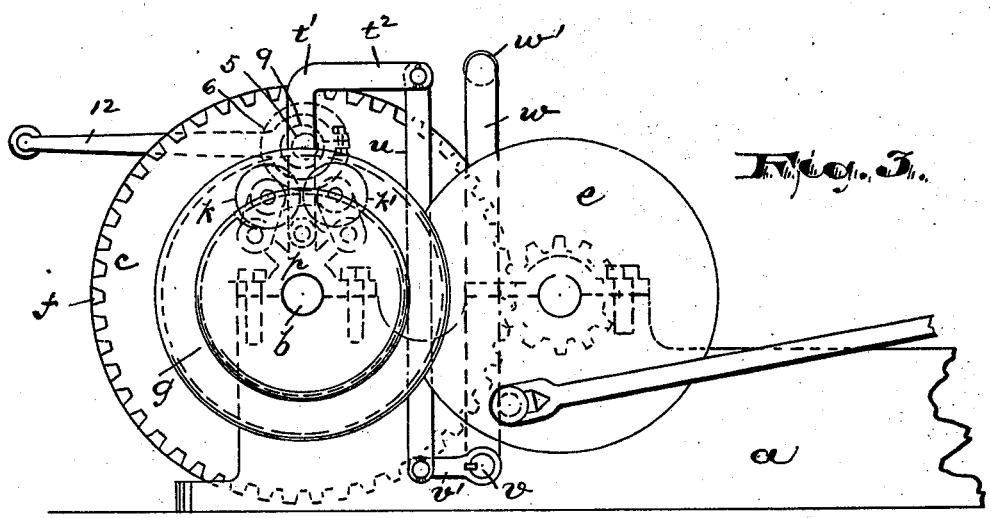

Referring to the accompanying drawings, in which like characters of reference indicate corresponding parts in each of the several veiws, Figure 1 is a plan of a hoisting-engine to which my invention has been applied, the means for driving the drum being in central horizontal section on line $x$, Fig. 6, and the winch-driving means in similar section on line $y$, Fig. 5. Fig. 2 is a front elevation of the hoisting-engine, the drum being broken to show the shaft and the drum-driving means being in central vertical section as on line $x'$, Fig. 6. Fig. 3 is a side view of the hoisting-engine looking at the winch. Fig. 4 is a front elevation of the winch and related parts of the hoisting-engine, the winch-driving means being in central vertical section on line $y'$, Fig. 5. Fig. 5 is a cross-section on line $z\,z$, Fig. 4. Fig. 6 is a side view of the engine from the standpoint of the operator. Figs. 7 and 8 are detail cross-sections of the drum and winch, respectively, with their driving-pinions, taken on lines $z'$ and $z^2$, respectively, of Fig. 2. Figs. 9 and 10 show in perspective, respectively, a certain connecting-bar and a pair of united links sometimes employed; and Figs. 11 and 12 illustrate modified constructions of the same, respectively.

In said drawings I have shown my invention as applied to a derrick hoisting-engine of usual form, $a$ indicating the bed-frame of said engine, in which the drum-shaft $b$ is journaled near its opposite ends. Said drum-shaft carries the usual gear-wheel $c$, keyed thereto and engaging with a driving-gear $c'$, fast on the power-shaft $d$, which also has its bearings $d'$ in the bed-frame $a$ and carries at its opposite ends crank-disks $e\,e$ to receive power from the engine.

Upon the drum-shaft $b$ is loosely mounted, preferably upon roller-bearings $b'$, as usual, a drum $f$, which is adapted to wind up the rope or cable running to the derrick and by which the load is hoisted. Upon the extreme end of the said drum-shaft $b$, outside of its bearings in the frame $a$, said drum-shaft carries a winch $g$ in the usual position. It will be understood that in the use of hoisting-engines this winch $g$, which freely projects at the side of the hoisting-engine, is used to receive a rope or cable quickly thrown therearound and do the lighter or transient parts of the work, such as swinging the derrick or derrick-boom to bring the load which has been lifted by the large drum $f$ into proper position for depositing. To illustrate this use of the winch, I have shown a rope $h$, having two or three turns around the winch and extending between guide-rollers $h'$ to the bull-wheel $i'$ of a derrick $i$, all as is common in the art and will be understood by one skilled therein.

My invention more particularly has reference to the winch $g$ and the manner of transmitting movement thereto in either direction from the drum-shaft $b$, which is continuously rotated in one direction by the engine. Said winch, it will be remembered, has heretofore been keyed fast upon the drum-shaft; but I make it loose upon the drum-shaft and capable of being rotated therewith in either direction, while preserving all the advantages of the former construction. To this end I provide the winch $g$ with an annular recess $j$ in the inner end or face next to the bearing $a$, said recess being open toward the working parts of the engine and having its outer peripheral wall $j'$ forming an internal grooved friction-surface $j^2$. Within said recess $j$ lie driving-pinions $k\ k'$, having their peripheries provided with grooved friction-surfaces $l$, adapted to engage with the friction-surface $j^2$ of the recess. These two driving-pinions $k\ k'$ lie near to each other and both close to the outer wall of the recess $j$ in the winch, as shown in Figs. 5 and 8, and are fast upon the ends of shafts $m\ m'$, parallel to the drum-shaft $b$, and preferably equidistant therefrom. These shafts $m\ m'$ are adapted to be simultaneously shifted sidewise in substantially the plane in which they lie to throw either one or the other of the driving-pinions into frictional contact with the internal friction-surface of the winch, as will be hereinafter more fully described. Said driving-pinions, it will be understood, are continually rotated in opposite directions, and when one is in contact with the interior friction-surface of the recess $j$ it imparts its rotary motion to the winch and said winch may accordingly be driven in one direction or the other, as it is engaged by one or the other of the said driving-pinions. To transmit rotary motion to said friction-pinions, I provide a gear-wheel $n$, keyed upon the drum-shaft $b$ adjacent to the large gear-wheel $c$ and intermeshing with a follower $o$, fast upon one of the shafts, as $m$, of the driving-pinion. This follower or second gear-wheel $o$ is wider than the driving gear-wheel $n$, as shown in Fig. 2, and at its projecting portion engages with another gear-wheel $o'$, fast on the other driving-pinion shaft $m'$. It will be seen, therefore, that the driving-pinion shaft $m$ is driven in one direction by the direct engagement of its gear-wheel $o$ with the main gear-wheel $n$, while the other driving-pinion shaft $m'$ is oppositely rotated by engagement of its gear-wheel $o'$ with the first gear-wheel $o$. This gives the desired opposite rotary movements to the pinions $k\ k'$, as will be understood.

To support the driving-pinion shafts $m\ m'$ so as to permit their being shifted at right angles to their length or backward and forward with reference to the hoisting-engine to bring either pinion into engagement with the winch, I have provided the cap $p$ of the bearing of the drum-shaft $b$ in the frame $a$ with diverging arms $p'\ p^2$, which extend radially upward in side view and are perforated at their upper ends each to receive a pivotal pin $q$, extending parallel to the drum-shaft $b$. Upon each of said pivotal pins are pivoted the lower ends of links $r\ r$, lying one on each side of the arm $p'$, (or $p^2$,) the pair upon the forward arm $p'$ being perforated at their upper ends to receive and provide bearings for the driving-pinion shaft $m$, while the pair upon the rear arm $p^2$ similarly receive at their upper ends the other driving-pinion shaft $m'$. A bar $s$ (best shown in Figs. 5 and 9) connects the two driving-pinion shafts $m\ m'$ between their respective pairs of links and serves to hold them always at a fixed distance apart. Said link is centrally apertured, as at $s'$, to receive an upright lever $t$, extending down therethrough and being pivoted at its lower end upon an arm $p^3$, projecting from the bearing-cap $p$ intermediate of the two arms $p'\ p^2$ and in the same vertical plane therewith. Said lever $t$ snugly fits in its aperture in the bar $s$, and it will be seen that by swinging the upper end of said lever either backward or forward the bar $s$ and shafts $m\ m'$, and with them the pinions $k\ k'$, will be swung in a corresponding direction upon the pins $q\ q$, passing through the lower ends of the links $r\ r\ r\ r$ as pivots. As a matter of fact in practice very slight movement of the driving-pinions is needed to engage or disengage them with the winch, and this movement does not carry the intermeshing gears $n\ o$ out of engagement nor call for more play than said gears would naturally have.

To operate the lever $t$, the said lever is bent backward, as at $t'$, to form a horizontal arm $t^2$, and this arm is loosely pivoted to the upper end of a vertical connecting-rod $u$, which extends downward between the crank-disk $e$ and bearing $a$ and is at its lower end loosely pivoted to the extremity of an arm $v'$, keyed upon a shaft $v$, extending transversely of the hoisting-engine and having its bearings in the bed-frame $a$. To the extremity of said shaft at the opposite side of the hoisting-engine from the winch and where the operator usually stands is keyed a crank $w$, having a handle $w'$, by means of which the shaft $v$ can be oscillated. Any other means, however, than the lever $t$ and connections described can be used for swinging the driving-pinion shafts $m\ m'$ backward or forward, and the exact arrangement described for supporting said driving-pinion shafts $m\ m'$ may be varied without affecting the essence of my invention, which is to impart motion to the winch through friction-pinions adapted to drive said winch in either direction, as desired, without reversing the engine.

It will be noted that the winch itself is left perfectly free and projecting from the hoisting-engine in the usual manner, so that there is no impediment to the quick throwing of a rope about said winch or the using of the same in any manner which has been common heretofore.

Under some conditions I may join together each two links, forming a pair for one driving-pinion shaft, by an integral connection $r^2$, as shown in Figs. 1 and 10, the links so united being marked $r'$. It is also obvious that in hoisting-engines of my improved construction the friction-pinions for engaging the winch may be made of different sizes, so as to get different speeds and powers of the winch in its different directions of rotation. These would, furthermore, each be available either in hoisting or slacking down, as desired, by reversing the winding of the rope upon the winch, as will be understood.

Instead of using two driving-pinions I may under some conditions employ a single pinion, and this construction I have illustrated as applied to the main drum $f$ of the hoisting-engine, (shown in the drawings,) although it will be entirely evident that it may just as well be applied to the winch. It will also be understood that the two-pinion construction which I have described as applied to the winch $g$ might equally well be used in connection with the drum $f$, if desired, the two constructions being shown as applied one to the winch and the other to the drum of the same hoisting-engine for convenience in illustration merely. Where a single driving-pinion is employed, the end of the drum (or winch, it will be understood) next to the operator is provided with an annular recess 2, similar to that already described in connection with the two-pinion construction, but preferably of less radial width in proportion to the size of the drum and having both its outer and inner walls 3 and 4, respectively, provided with grooved friction-surfaces. Into said recess 2 projects a shaft 5, having fast upon its end a friction-pinion 6, lying within the annular recess and having a circumferentially-grooved periphery adapted to fit against the grooved walls of said recess. This pinion 6 is of slightly-smaller diameter than the width of the recess 2, so that it can lie idle in said recess or by a very slight movement be made to engage either the outer or inner wall of said recess. Said driving-pinion 6 is continuously rotated in one direction by means hereinafter described, and it will be evident that as the pinion is moved into engagement with the outer wall of the annular recess 2 the drum will be driven in one direction, while if the pinion is moved into engagement with the inner wall of the said recess the drum will be driven in the opposite direction. Moreover, it will be noticed that accordingly as the driving-pinion engages the outer or inner wall of the annular recess the drum will be driven at different speeds, the outer wall giving a less speed but greater power, which can be utilized for heavy work, while the inner wall will give a greater speed but less power, as may be useful where quick motion in light hoisting is desired.

To rotate the driving-pinion 6, its shaft 5 carries at its outer end a gear-wheel 7, which intermeshes with a driving gear-wheel 8, keyed upon the drum-shaft $b$. To provide for shifting the driving-pinion 6 back and forth between the outer and inner walls of the drum-recess 2, I have journaled its shaft 5 in an eccentric sleeve 9, intermediate of the pinion 6 and driving-gear 7, said sleeve being capable of oscillation in bearings 10 of any suitable formation extending upward from the cap 11 of the bearing of the drum-shaft in the bed-frame $a$. A horizontally-disposed handle 12 projects from said eccentric sleeve, being fast thereto, and by means of which handle the sleeve can be oscillated, each oscillation of the sleeve 9 raising or lowering the shaft 5 and the pinion 6, as will be understood, without carrying the gear-wheels 7 8 out of engagement. Any other equivalent shifting device may be employed, however. In order to get the pinion 6 into place in the drum-recess 2, with its friction-grooves interlocking with those on both outer and inner walls of the recess, I have provided in the inner wall a removable segment 13, Fig. 7, which dovetails into place and is fastened by a screw 14.

While I have shown and described the engaging surfaces of the driving-pinions and the drum or winch as circumferentially grooved, this particular style of engagement is not essential to my invention. It is important only that some form of friction-surfaces be used which will permit slipping under too great strain and which will allow the parts to be thrown into engagement while the hoisting-engine is running at full speed—that is, frictional engagement is preferable to gearing or other positive clutching.

Upon the drum $f$ I have shown usual ratchet-teeth 15 and a pawl 16, pivoted on a stud 17 from the bed-frame and adapted to hold the drum when desired. I have also shown in Figs. 1 and 6 brake-bands 18 181 on the drum and winch, respectively, said brake-bands being connected to and operated by horizontal shafts 19 191, having bearings in the bed-frame of the hoisting-engine and extending transversely thereof to the side at which the operator stands and being thereat provided with pedals 20 201. Said brakes are of any usual and well-known construction, except that for obvious reasons one of the shafts, as 19, is hollow to permit a concentric interior disposition of the other.

I may sometimes prefer to split each link supporting a driving-pinion shaft, as shown in Fig. 12, the two halves R R being then bolted together, as at $R^2$, to enable wear to be taken up. To secure greater firmness of the shaft as well as less number of pieces, the bearing R' for the shaft may in this construction extend from one half-link R to the next on the same side of the shaft. A yoke-like connecting-bar S is then used, which lies upon the bearing R' between the links.

It will be noticed that in my improved construction the winch g becomes essentially the same thing as the drum f, differing therefrom only in size and location. I have therefore used the word "drum" in the following claims as a generic term including any winding or rope-receiving device.

Having thus described the invention, what I claim as new is—

1. In a hoisting-engine, the combination with a drum-shaft projecting at one end beyond its bearings, and means for driving said shaft, of a winch mounted loose on said projecting end of the shaft, said winch terminating at its outer end approximately with the extremity of the shaft and permitting free access to its periphery, and means adapted to engage the inner end of the winch to transmit motion thereto from the drum-shaft and turn said winch either with or against the shaft, substantially as set forth.

2. In a hoisting-engine, the combination with a drum-shaft adapted to be continuously rotated in one direction, and means for rotating said shaft, of a drum mounted loose on said shaft and presenting a free peripheral exterior, and means adapted to frictionally transmit motion to said drum at its end and rotate said drum either with or against the shaft, substantially as set forth.

3. In a hoisting-engine, the combination of the drum-shaft, a drum mounted loose on said shaft, and means at one side of, and receiving motion from, said shaft, said means being adapted to be brought into engagement to turn said drum either with or against the shaft, substantially as set forth.

4. In a hoisting-engine, the combination with a drum-shaft adapted to be rotated continuously in one direction, of a drum mounted loose on said shaft and having at its end a friction-surface substantially concentric with and parallel to the said shaft, and driving means receiving motion from the drum-shaft and adapted to be forced in a direction at right angles thereto into frictional engagement with the drum, substantially as set forth.

5. The combination with a drum-shaft and a drum loose thereon, of two movable pinion-shafts parallel to said drum-shaft and to each other, one of said pinion-shafts receiving motion from the drum-shaft and the other receiving motion from the first, and pinions on said shafts adapted to engage the drum.

6. The combination with a drum mounted loose upon a shaft, of two swinging shafts receiving motion from a common rotary driver, one directly and the other through an intermediate member, said rotary driver, pinions upon said swinging shafts to engage the drum, and means for moving said shafts.

7. In a hoisting-engine, the combination with a drum-shaft, a drum mounted loose thereon and having an annular recess in its end, of a shaft parallel to the drum-shaft, a friction-pinion lying in the said annular recess of the drum and being fast on said parallel shaft and rotated thereby, and means for shifting said pinion into or out of engagement with a wall of the said recess in the drum, substantially as set forth.

8. The combination with a drum-shaft and a drum mounted loose thereon, of driving-pinion shafts parallel to said drum-shaft, means for transmitting motion from the drum-shaft to rotate said pinion-shafts oppositely with respect to each other, pinions on said shafts to engage the drum, links pivotally supported at their lower ends and at their upper ends providing journal-bearings for said pinion-shafts, a connecting-bar holding said upper ends of said links at a fixed distance apart and means for swinging said links.

9. In a hoisting-engine, the combination with a drum-shaft and a drum loose on said shaft, said drum being recessed at one end to provide a friction-surface concentric with and parallel to the shaft, a friction-pinion adapted to engage at its periphery the said friction-surface on the drum, a driving-shaft parallel to the drum-shaft and having the said pinion fast thereon, a train of gearing transmitting motion from the drum-shaft to said pinion-shaft, and means for shifting the pinion-shaft toward or away from the drum-shaft without throwing it out of gear therewith, substantially as set forth.

10. The combination with a bed-frame, a, a drum-shaft journaled therein, and a drum loose on the projecting end of said shaft, of driving-pinion shafts parallel to said drum-shafts, means for transmitting motion to said pinion-shafts to rotate them oppositely with respect to each other, pinions on said shaft to engage the drum, a cap p, for the journal-bearings of the drum-shaft in the bed-frame adjacent to the said drum, links pivoted on said cap at their lower ends and at their upper ends providing bearings for the pinion-shafts, a connecting-bar holding said pinion-shafts at a fixed distance apart and a lever t, fulcrumed at its lower end on the said cap p, and adapted to swing the pinion-shafts.

11. In a hoisting-engine, the combination with a drum-shaft and a drum loosely mounted thereon, said drum being recessed or bored out at one end and having circumferential friction-grooves on the outer walls of said recess, of friction-pinions lying in said recess and being circumferentially grooved to cooperate with said friction-surface on the drum, shafts parallel to the drum-shaft and on which said friction-pinions are keyed, means for driving said shafts from the drum-shaft in opposite directions and means for shifting said shafts to engage or disengage the pinions with respect to the drum, substantially as set forth.

12. The combination with the drum-shaft b, of a drum mounted loose thereon and having an internal friction-surface, friction-pinions adapted to alternately engage said internal friction-surface of the drum, shafts disposed parallel to the drum-shaft and upon which said pinions are keyed, a gear-wheel fast upon one of said pinion-shafts and receiving motion from the drum-shaft, a second gear fast on the second pinion-shaft and receiving motion from the first gear-wheel, and means for supporting said pinion-shafts and permitting them limited sidewise movement, substantially as set forth.

13. The combination with a drum-shaft, a drum mounted loose on said shaft, friction-pinions adapted to engage the drum and being fast on separate shafts, and means for transmitting motion from the drum-shaft to rotate said pinion-shafts in opposite directions with respect to each other, links each pivotally supported at its lower end and at its upper end providing journal-bearings for one of the pinion-shafts, a connecting-bar holding the upper ends of said links at a fixed distance apart, and means for swinging said links in unison, substantially as set forth.

14. The combination with the drum-shaft and a drum having an internal friction-surface, of friction-pinions adapted to engage the drum, shafts for said pinions parallel to the drum-shaft, means for oppositely rotating said pinion-shafts, links each pivotally supported at its lower end and having a pinion-shaft journaled in its upper end, a connecting-bar holding said pinion-shafts at a fixed distance apart and being vertically apertured, a lever extending downward through said apertured connecting-bar and being at a lower point fulcrumed to swing in a vertical plane transverse to the pinion-shafts, and means for swinging said lever, substantially as set forth.

15. In a hoisting-engine, a drum-shaft, a winch or spool mounted loose on the projecting end of the drum-shaft and having its peripheral groove freely accessible from the outer end, and means adapted to transmit motion to the inner end portion of the winch and turn said winch either with or against the drum-shaft.

16. In a hoisting-engine, a shaft, a winch mounted loose on the end of said shaft and having its rope-receiving periphery freely exposed at the outer end, and means for frictionally transmitting motion to the other end of the winch to turn the same in either direction.

17. In a hoisting-engine, a shaft, a winch mounted loose on the freely-projecting end of said shaft and having a peripheral rope-receiving groove, means for holding said winch on the shaft while permitting free access to said rope-receiving groove over the outer ends of the winch and shaft, and means for frictionally transmitting motion to the inner end portion of the winch to turn the same either with or against the shaft.

In testimony that I claim the foregoing I have hereunto set my hand this 30th of January, 1901.

COLIN CAMPBELL.

Witnesses:
CHARLES H. PELL,
RUSSELL M. EVERETT.